(12) United States Patent
Hreha (10) Patent No.: US 7,149,648 B1
(45) Date of Patent: Dec. 12, 2006

(54) SYSTEM AND METHOD FOR RELATIVE POSITIONING OF AN AUTONOMOUS VEHICLE

(75) Inventor: Mark A. Hreha, Alton, IL (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 11/204,301

(22) Filed: Aug. 15, 2005

(51) Int. Cl.
*G06F 15/00* (2006.01)
(52) U.S. Cl. ...................... 702/152; 702/150
(58) Field of Classification Search ........... 702/150, 702/152
See application file for complete search history.

(56) References Cited

U.S. PATENT DOCUMENTS 3,952,309 A * 4/1976 Lammers ............... 342/411
5,239,310 A * 8/1993 Meyers et al. ........... 342/453

OTHER PUBLICATIONS

Walworth, M; Mahajan, A;("3D Position Sensing Using the Difference in Time-of-Flights From A Wave Source to Various Receivers"; Proceedings 8th International Conference on Advanced Robotics; Jul. 7-9, 1997; pp. 611-616.*

Dehak, S; Bloch, I; Maitre, H; "Spatial Reasoning with Incomplete Information on Relative Positioning"; IEEE Transactions on Pattern Analysis and Machine Intelligence; vol. 27, issue 9; Sep. 2005; pp. 1473-1484.*

* cited by examiner

*Primary Examiner*—Michael Nghiem
*Assistant Examiner*—Douglas N Washburn
(74) *Attorney, Agent, or Firm*—Lee & Hayes, PLLC (57) ABSTRACT

Methods, systems, and articles of manufacture determine the position of a reference point relative to a vehicle. The reference point includes a transmitter operatively configured to transmit a first waveform and a second waveform having a relationship with the first waveform. The vehicle has a plurality of receivers disposed at a plurality of locations relative to the vehicle. The first waveform is detected by each of the receivers. The second waveform is detected by at least three of the receivers, each of which detects a respective number of cycles of the second waveform between the time the first receiver detects the first waveform and when the first waveform is detected by the respective receiver. The reference point position is calculated using a triangulation technique based on each of the identified number of cycles and each location of the receivers detecting the second waveform.

26 Claims, 5 Drawing Sheets

SYSTEM AND METHOD FOR RELATIVE POSITIONING OF AN AUTONOMOUS VEHICLE

BACKGROUND OF THE INVENTION

The present invention relates to methods for vehicle navigation and guidance, and more particularly, to methods and systems for determining a position of a reference vehicle relative to an autonomous vehicle.

An autonomous vehicle has an independent navigation or guidance system that is not directly controlled by another vehicle. Precise positioning of autonomous vehicles, such as aircraft, watercraft and automobiles, relative to one or more stationary or moving references is commonly required for space, air, and surface operations such as ground or carrier-based landing, in-flight aircraft refueling, aircraft formation maneuvers, spacecraft docking, and collision avoidance. Conventional techniques for determining a position of a vehicle relative to a stationary or moving reference includes digital imagery processing, active sensor techniques (e.g., radar or laser techniques), and global positioning techniques (GPS). Digital imagery processing and active sensor techniques typically require sophisticated, expensive sensor equipment and human pilot interaction with the autonomous vehicle, which may be problematic in certain operations such as aircraft refueling or formation maneuvers. Conventional GPS techniques require four GPS satellite transmitters, which are susceptible to incidental or overt disruptions in transmissions to an autonomous vehicle, causing delays and errors in determining the position of the autonomous vehicle relative to the GPS satellites.

Therefore, a need exists for systems and methods that overcome the problems noted above and others previously experienced for determining the position of an autonomous vehicle.

SUMMARY OF THE INVENTION

In accordance with methods consistent with one implementation of the present invention, a method for determining a position of a reference point relative to a vehicle is provided. The reference point includes a transmitter and the vehicle includes a plurality of receivers. The transmitter is operatively configured to transmit a first waveform and a second waveform having a relationship with the first waveform. The method comprises: detecting the first waveform by each of the receivers; detecting the second waveform by at least three of the receivers; identifying a first time when the first waveform is detected by one of the receivers; identifying, for each of the receivers detecting the second waveform, a respective number of cycles of the second waveform between the first time and when the first waveform is detected by the respective receiver; and calculating the position of the reference point using a triangulation technique.

In accordance with articles of manufacture consistent with one implementation of the present invention, a computer-readable medium containing instructions that cause a vehicle having a program to perform a method for determining a position of a reference point relative to the vehicle is provided. The reference point includes a transmitter and the vehicle includes a plurality of receivers. The transmitter is operatively configured to transmit a first waveform and a second waveform having a relationship with the first waveform. The method comprises: identifying a first time when the first waveform is detected by one of the receivers; identifying, for each of the receivers other than the first receiver, a respective number of cycles of the second waveform detected by the respective receiver between the first time and when the first waveform is detected by the respective receiver; and calculating the position of the reference point using a triangulation technique.

In accordance with systems consistent with one implementation of the present invention, a vehicle positioning system is provided. The vehicle positioning system comprises a first vehicle having a transmitter operatively configured to emit a first waveform having a first frequency and a second waveform having a second frequency. The second waveform has a plurality of cycles. The vehicle positioning system further comprises a second vehicle having a plurality of receivers and a computer system operatively connected to each receiver. Each receiver is operatively configured to detect the first waveform and to identify to the computer system a respective number of second waveform cycles detected after the first waveform is detected by a first of the plurality of receivers. The computer is operatively configured to convert the respective number of second waveform cycles counted by each of the receivers other than the first receiver into a corresponding distance, and to determine a position of the first vehicle relative to the second vehicle based on the corresponding distances.

In accordance with systems consistent with one implementation of the present invention, a system for determining a position of a reference point relative to a vehicle is provided. The reference point has a transmitter and the vehicle has a plurality of receivers. The transmitter is operatively configured to transmit a first waveform and a second waveform having a relationship with the first waveform. The system comprises: means for detecting the first waveform by each of the receivers; means for detecting the second waveform by at least three of the receivers; means for identifying a first time when the first waveform is detected by a first of the receivers; means for identifying, for each of the receivers detecting the second waveform, a respective number of cycles of the second waveform detected by the respective receiver between the first time and when the first waveform is detected by the respective receiver; and means for calculating the position of the reference point using a triangulation technique.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION

Reference will now be made in detail to an implementation in accordance with methods, systems, and products consistent with one implementation of the present invention as illustrated in the accompanying drawings. Methods, systems, and articles of manufacture consistent with one implementation of the present invention determine a position or location of a reference vehicle or stationary point relative to an autonomous (or control) vehicle, allowing the autonomous vehicle to maintain a predetermined distance, range, or guidance profile relative to the reference vehicle or point without the reference vehicle or point communicating position information to the autonomous vehicle.

Figure 1:
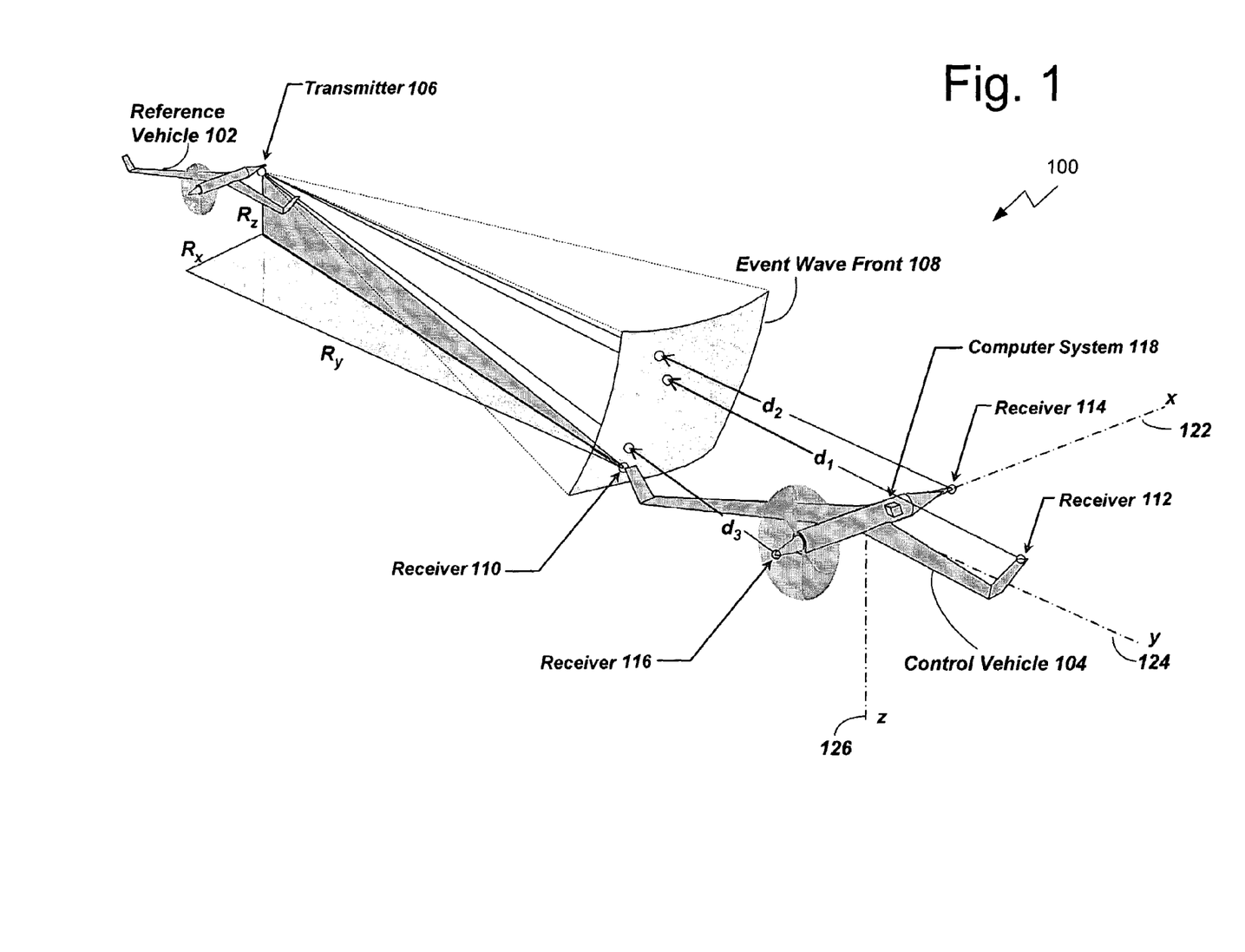
FIG. 1 is a diagram of a control vehicle having a system for determining the relative position of a reference vehicle consistent with one implementation of the present invention.
Figure 2:
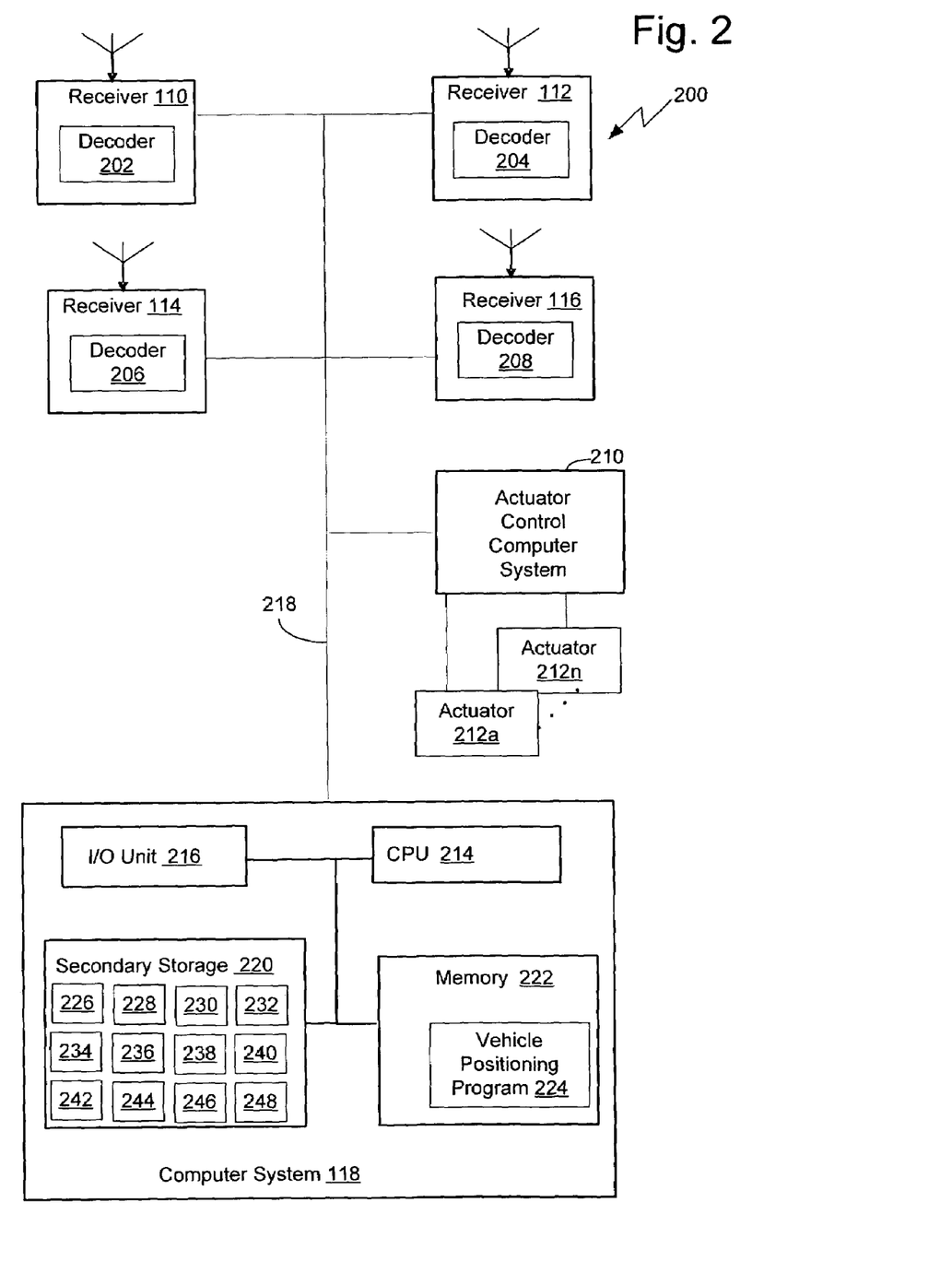
FIG. 2 is an exemplary block diagram of the relative positioning system of FIG. 1.
Figure 3:
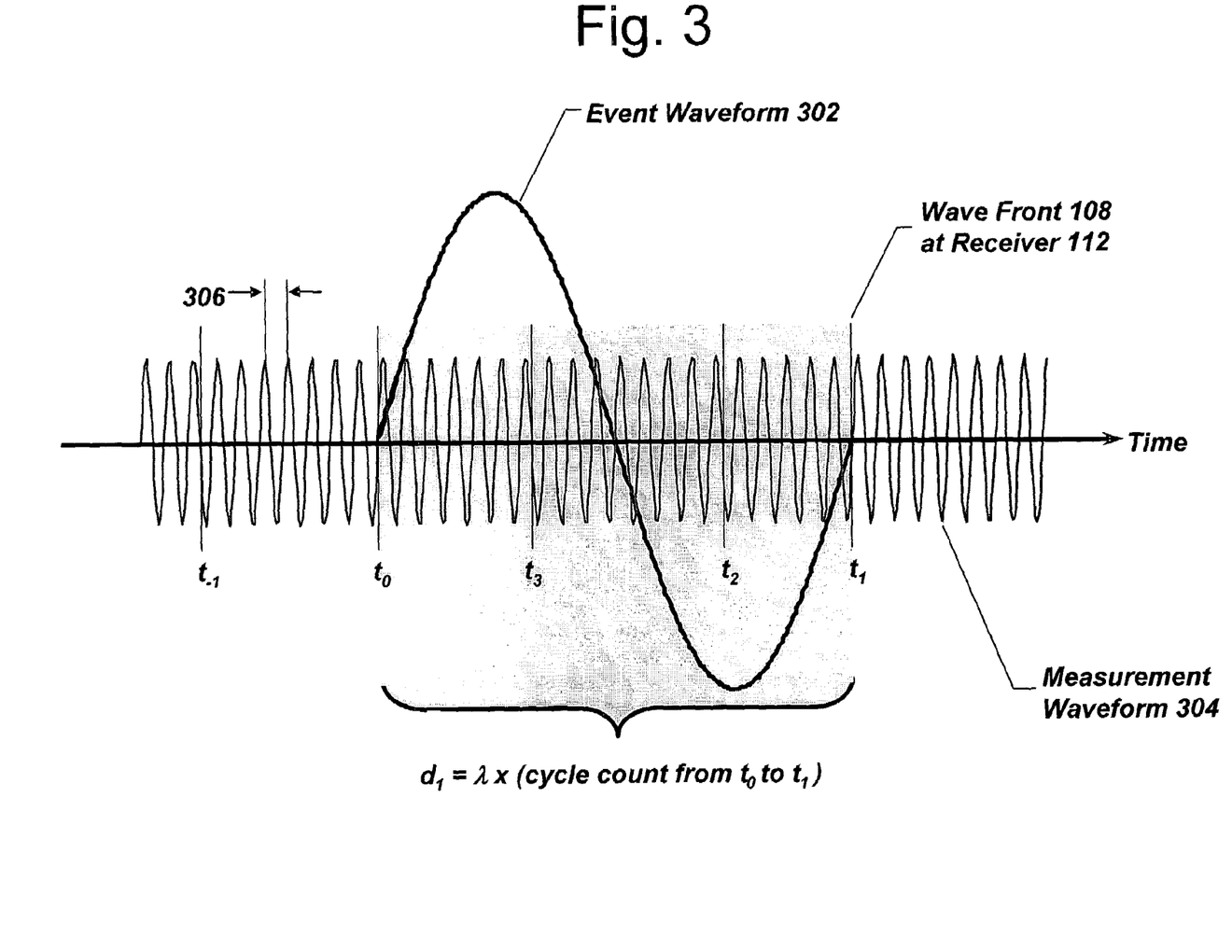
FIG. 3 depicts an exemplary event waveform and an exemplary measurement waveform detected by at least three receivers of the relative positioning system to determine relative position of the reference vehicle in accordance with the present invention.

FIG. 1 depicts a diagram of a vehicle positioning system 100 including a reference or first vehicle 102 and a control or an autonomous second vehicle 104. The autonomous vehicle 104 includes a relative positioning system 200 as shown in FIG. 2 for determining the position of the reference vehicle 102 relative to the control vehicle 104 in accordance with methods and systems consistent with one implementation of the present invention. The reference vehicle 102 includes a transmitter 106 and the relative positioning system 200 of the autonomous vehicle 104 includes a plurality of receivers 110, 112, 114, and 116 and a computer system 118 operatively connected to each receiver. The transmitter 106 of the reference vehicle 102 is operatively configured to emit a first or event waveform 302 and a second or measurement waveform 304 having a relationship with the event waveform 302 as depicted in FIG. 3. Although the measurement waveform 304 may have other relationships with the event waveform 302, in one implementation of the present invention, the measurement waveform has a fixed and known number of cycles for each event waveform cycle when emitted by the transmitter 106. The event waveform 302 and the measurement waveform 304 may be detected by at least three receivers 110, 112, 114, and 116 of the relative positioning system 200 to determine the position of the reference vehicle 102 relative to the autonomous vehicle 104 in accordance with the present invention.

The event waveform 302 signals the start and end of a measurement period to the relative positioning system 200 of the autonomous vehicle 104 as described in further detail below. In one implementation, the event waveform 302 signals the start of the measurement period to the relative positioning system 200 when a first receiver (e.g., receiver 110) of the relative positioning system 200 detects the event waveform 302 and signals the end of the measurement period when a last of at least three receivers 112, 114, and 116 detects the event waveform 302. The event waveform 302 may be a single pulse or a periodic or continuous waveform having a first frequency. The front 108 of the event waveform 302 is shown in FIG. 1 as detected by the relative positioning system 200 of the autonomous vehicle 104 at a first of the receiver locations (e.g., location of receiver 110). When the event waveform front 108 reaches the first receiver 110, the position of the reference vehicle 102 or reference point (i.e., transmitter 106) is represented by the unknown coordinates ($R_x$, $R_y$, $R_z$). The range R from the reference vehicle 102 or transmitter 106 to the first receiver 110 is given by Equation (1). The distance from the reference vehicle 102 or transmitter 106 to each receiver 112, 114, and 116 other than the first receiver is equal to the unknown range R plus the respective distance $d_1$, $d_2$, and $d_3$, each of which is derived in accordance with methods and systems consistent with one implementation of the present invention.

$$R=\sqrt{R_x^2+R_y^2+R_z^2} \quad (1)$$

The relative positioning system 200 is operatively configured to derive the unknown coordinates ($R_x$, $R_y$, $R_z$) based on Equation (1) and the geometric relationship between the reference vehicle 102 and the receivers 110, 112, 114, and 116 as reflected in Equation (2).

$$(R_x-\tilde{x}_i)^2+(R_y-\tilde{y}_i)^2+(R_z-\tilde{z}_i)^2=(R+d_i)^2 \quad (2)$$

where the differences $\tilde{x}_i$, $\tilde{y}_i$, and $\tilde{z}_i$ between the respective coordinates of the first receiver 110 and each other receiver 112, 114, and 16 are derived as follows:

$$\tilde{x}_i=x_i-x_0,\ \tilde{y}_i=y_i-y_0,\ \tilde{z}_i=z_i-z_0 \text{ for } i=1,2,3 \quad (3)$$

As shown in FIG. 3, the measurement waveform 304 has a second frequency and a plurality of cycles 306 that are used by the relative positioning system 200 to derive the relative position of the reference vehicle 102 after the event waveform 302 is detected by the system 200 to start the measurement operation. In one implementation, the second frequency of the measurement waveform 304 is higher than the first frequency of the first waveform 302 such that each distance $d_1$, $d_2$, and $d_3$ may be derived by the relative positioning system 200 by counting cycles 306 of the measurement waveform 304 as detected by each receiver 112, 114, and 116 other than the first receiver 110 for a predetermined period (e.g., period=$t_1$-$t_0$ for receiver 112 in FIG. 3) after the front 108 of the event waveform is initially detected by the relative positioning system 200 until the front 108 is detected by the respective receiver 112, 114, or 116. The accuracy of the distance determination may be increased by increasing the frequency (e.g., decreasing the wavelength) of the measurement waveform 304 relative to the frequency of the event waveform 302.

In another implementation, the reference vehicle 102 may be replaced by a stationary reference point having the transmitter 106. Moreover, although the reference vehicle 102 is depicted as an airplane in FIG. 1, the reference vehicle 102 may be an automobile, tank, ship, or other vehicle or vessel.

In one implementation, each receiver 110, 112, 114, and 116 is operatively configured to detect the event waveform 302 and the measurement waveform 304 and to count a respective number of waveform cycles 306 after the event waveform 302 is detected by a first of the receivers (e.g., receiver 110 or the closest receiver to the transmitter 106 depending on the orientation of the autonomous vehicle 104) until the event waveform 302 is detected by the respective receiver (e.g., receiver 112). Each receiver may be triggered to simultaneously start counting cycles 306 of the measurement waveform 304 at a time $t_1$ as shown in FIG. 3, to report each incremental or fractional count to the computer system 118, and to report a respective time (e.g., $t_0$, $t_1$, $t_2$, and $t_3$ in FIG. 3) to the computer system 118 when the event waveform 302 is detected by the respective receiver 110, 112, 114, and 116. The computer system 118 is operatively configured to recognize the first of the receivers (e.g., receiver 110) to detect the event waveform 302 based on the respective time ($t_0$, $t_1$, $t_2$, and $t_3$ in FIG. 3) reported by each receiver 110, 112, 114, and 116. The computer system 118 is also operatively configured to derive the number of cycles 306 counted by another of the receivers (e.g., receiver 112) based on the total count of cycles 306 and fraction of cycles received from the other receiver 112 after the first receiver 110 detects the event waveform 302 until the other receiver detects the event waveform 302.

Each receiver 110, 112, 114, and 116 is disposed at one of a plurality of locations within a coordinate system 120 relative to the autonomous vehicle 104. The coordinate system 120 has an x-axis 122, a y-axis 124, and a z-axis 126. In the implementation shown in FIG. 1, the origin of the coordinate system 120 is arbitrarily located along the longitudinal body axis (i.e., the x-axis 122) of the autonomous vehicle 104. However, the origin of the coordinate system 120 may be located at another point on or in relation to the autonomous vehicle 104. In this implementation, the x-axis 122 and the z-axis 126 form a plane of symmetry along the longitudinal body axis of the autonomous vehicle 104. The y-axis 124 is orthogonal to the x-axis 122 and the z-axis 126. The locations of receivers 110, 112, 114, and 116 in the coordinate system 120 are denoted as $(x_0, y_0, z_0)$, $(x_1, y_1, z_1)$, $(x_2, y_2, z_2)$, and $(x_3, y_3, z_3)$, respectively. As shown in FIG. 2, each receiver 110, 112, 114, and 116 may include a decoder 202, 204, 206, or 208, respectively, to decode the event waveform 302 and the measurement waveform 304 if either waveform is encrypted, modulated, or encoded using a known coding technique such as pulse modulation, frequency hopping, or spread spectrum coding.

The relative positioning system 200 may also include an actuator control computer system 210 operatively configured to receive, via the computer system, a position of the reference vehicle 102 relative to the autonomous vehicle 104 as derived in accordance with methods and systems consistent with one implementation of the present invention and to control one or more actuators 212a–212n of the autonomous vehicle 104 so the autonomous vehicle 104 maintains a predetermined distance or guidance profile. For example, when the autonomous vehicle 104 is an airplane, the actuator control computer system 210 may correspond to a flight control computer that controls actuators 212a–212n configured to move flight control surfaces such as a rudder or an aileron.

Returning to FIG. 2, the computer system 118 comprises a central processing (CPU) or processor 214 and an input/output (I/O) unit 216 operatively configured to allow the processor 210 to communicate or interface with the receivers 110, 112, 114, and 116 and the actuator control computer system 210 over a network or bus 218. The computer system 118 may also include a secondary storage device 220 and a memory 222.

Memory 222 comprises a relative positioning program 224 for determining the position of the reference vehicle 102 relative to an autonomous vehicle 104. As described in further detail below, the relative positioning program 224 of the computer system 118 is operatively configured to: identify a first of the receivers (e.g., receiver 110) to detect the event waveform 302; identify a respective number of measurement waveform cycles 306 counted by each of at least three of the other receivers 112, 114, and 116 during a respective period after the event waveform 302 is detected by the first receiver 10 and until the event waveform is subsequently detected by the respective other receiver 112, 114, or 116; convert the respective number of measurement waveform cycles 306 counted during the respective period into a corresponding distance $d_1$, $d_2$, and $d_3$; and to determine the position of the reference vehicle 102 relative to the autonomous vehicle 104 based on the corresponding distances $d_1$, $d_2$, and $d_3$ and respective locations 226, 228, 230, and 232 of at least three receivers within the coordinate system 120 of the autonomous vehicle 104 (e.g., locations $(x_0, y_0, z_0)$, $(x_1, y_1, z_1)$, $(x_2, y_2, z_2)$ and $(x_3, y_3, z_3)$).

In one implementation, the locations 226, 228, 230, and 232 of the receivers 110, 112, 114, and 116 within the coordinate system 120 of the autonomous vehicle 104 are stored in secondary storage 220 for access by the program 224. The respective time 234, 236, 238, and 240 (e.g., $t_0$, $t_1$, $t_2$, and $t_3$ in FIG. 3) when each receiver 110, 112, 114, and 116 detects the event waveform 302 as reported to the computer system 118 may also be stored in secondary storage 220. The detection times 234, 236, 238, and 240 may each be stored in association with a respective cycle count 242, 244, 246, and 248 reflecting a number of waveform cycles 306 and cycle fractions independently detected by the receiver 110, 112, 114, and 116 during the respective period after the event waveform is detected by the first receiver (e.g., after time $t_0$) and until the event waveform 302 is subsequently detected by the respective receiver (e.g., time $t_1$, $t_2$ or $t_3$). Alternatively, the locations 226, 228, 230, and 232, the times 234, 236, 238, and 240 and the associated cycle counts 242, 244, 246, and 248 may be stored in memory 222.

One having skill in the art will appreciate that the relative positioning program 224 may reside in memory on a system other than data processing system 200. Program 224 may comprise or may be included in one or more code sections containing instructions for performing their respective operations. While program 224 is described as being implemented as software, the program may be implemented as a combination of hardware and software or hardware alone.

Although aspects of methods, systems, and articles of manufacture consistent with one implementation of the present invention are depicted as being stored in memory, one having skill in the art will appreciate that these aspects may be stored on or read from other computer-readable media, such as secondary storage devices, like hard disks, floppy disks, and CD-ROM; a carrier wave received from a network such as the Internet; or other forms of ROM or RAM either currently known or later developed. Further, although specific components of relative positioning system 200 have been described, one having skill in the art will appreciate that a relative positioning system or other data processing system suitable for use with methods, systems, and articles of manufacture consistent with one implementation of the present invention may contain additional or different components.

Each receiver 110, 112, 114, and 116 and the actuator control computer system 210 may each comprise components similar to those described above with respect to the computer system 118, such as a CPU, an I/O, a memory, and a secondary storage.

Figure 4A:
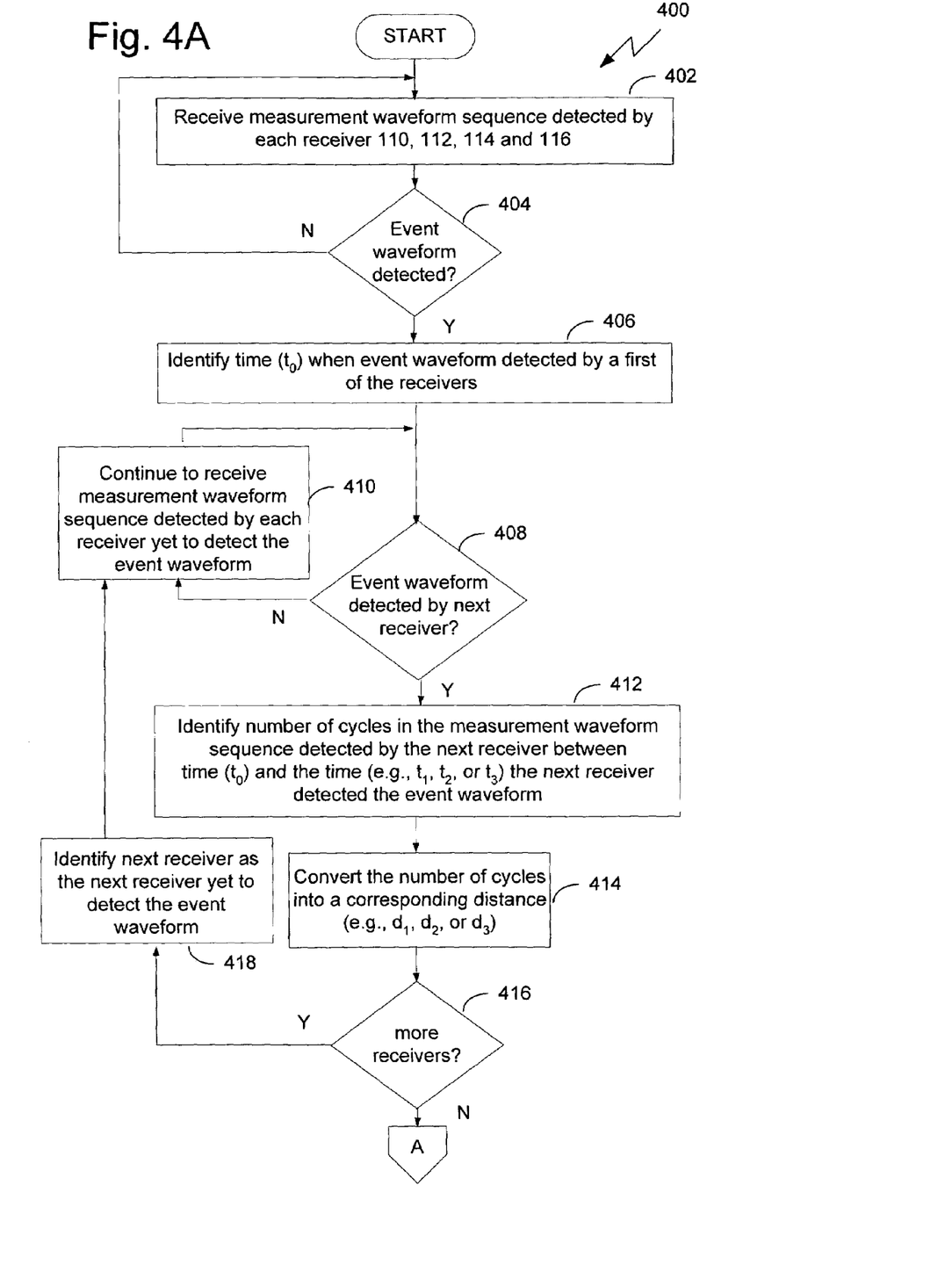
FIGS. 4A–B is a flow diagram of an exemplary process performed by the relative positioning system to determine the relative position of the reference vehicle.
Figure 4B:
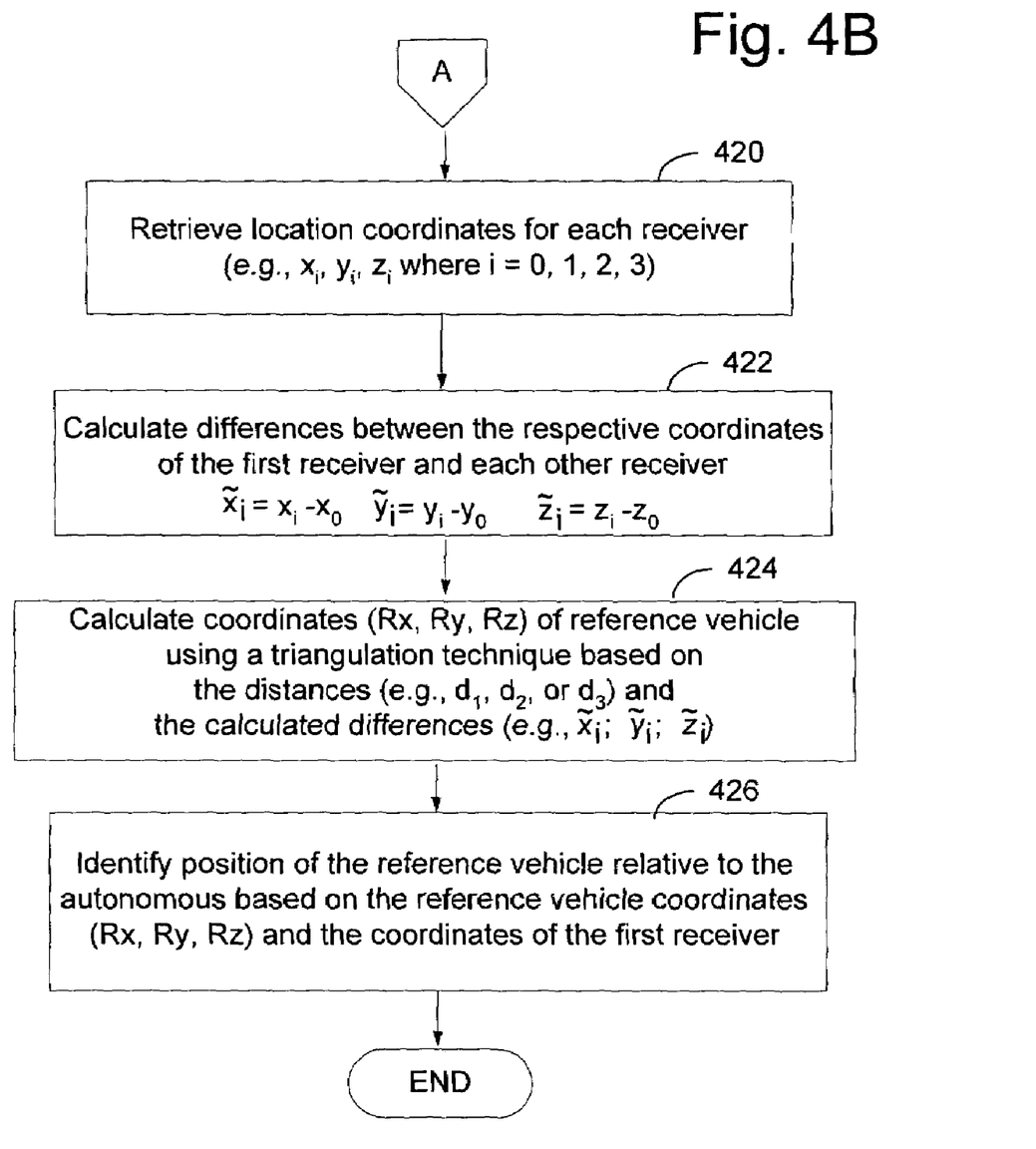

FIGS. 4A–B depict a flow diagram of an exemplary process 400 performed by the relative positioning program 224 to determine the position of the reference vehicle relative to the autonomous vehicle (hereafter "the relative reference position"). Initially, the program 224 receives a respective sequence of the measurement waveform 304 detected by each receiver 110, 112, 114, and 116 (step 402). In one implementation, each receiver 110, 112, 114, and 116 may provide a sequence of the measurement waveform 304 to the program 224 by digitizing the measurement waveform 304 into fractions of cycles 306 as the waveform 304 is being detected by the respective receiver after time $t_1$ and reporting the digitized measurement waveform 304 sequence to the program 224 via one or more messages on network 218. In this implementation, when a first receiver (e.g., receiver 110) detects the event waveform 302 at the time $t_0$, the program 224 is able derive from the digitized measurement waveform 304 sequence the respective cycle count 242, 244, 246, and 248 detected by the receiver 110, 112, 114, and 116 after time $t_0$ and until the event waveform 302 is subsequently detected by the respective receiver (e.g., time $t_1$, $t_2$ or $t_3$). In another implementation, each receiver 110, 112, 114, and 116 may report to the program 224 each incremental or fractional count of cycles 306 detected after the time $t_1$ such that the program 224 is able to derive the respective cycle count 234, 236, 238, and 240 detected by the receiver 110, 112, 114, and 116 between time $t_0$ and the time when the event waveform 302 is subsequently detected by the respective receiver (e.g., time $t_1$, $t_2$ or $t_3$).

Returning to FIG. 4A, the program 224 then determines whether the event waveform 302 has been detected by a first of the receivers (step 404). If the event waveform 302 has not been detected, the program 224 continues processing at step 402 to receive the respective sequence of the measurement waveform 304 detected by each receiver 110, 112, 114 and 116. If the event waveform 302 has been detected, the program 224 identifies the time $t_0$ when the event waveform 302 was detected by the first of the receivers (step 406). In the example depicted in FIG. 1, the receiver 110 is closet to the reference vehicle 102 and, thus, is the first to detect the event waveform 302 as the front 108 of the event waveform 302 passes receiver 110. Accordingly, in this example, the receiver 110 is the first to report a respective time (e.g., $t_0$ in FIG. 3) to the program 224 of the computer system 118 to identify when the event waveform 302 was detected by the receiver 110.

Next, the program 224 determines whether the event waveform 302 has been detected by a next receiver (step 408). In the example depicted in FIG. 1, after the first receiver 110 has identified the time $t_0$ when the event waveform 302 front 108 was first detected, the program 224 may await a message or indication from the next receiver 112, 114, or 116 of the respective time 236, 238, and 240 (e.g., $t_1$, $t_2$, and $t_3$ in FIG. 3) when the next receiver 112, 114, and 116 detected the event waveform 302. If the event waveform 302 has not yet been detected by a next receiver, the program 224 may continue to receive the respective measurement waveform sequence detected by each receiver yet to detect the event waveform 302 (step 410). Depending on the first frequency of the event waveform 302, the bandwidth of the network 218, and the processing speed of the CPU 214, the next receiver 112, 114, and 116 in step 402 may detect a respective waveform sequence including cycles 306 between time to when the event waveform 302 is first detected by the first receiver 110 and the time $t_1$, $t_2$, or $t_3$ when the event waveform 302 is detected by the next receiver 112, 114, or 116. However, in one implementation in which the processing speed of the CPU 214 is near or faster than the first frequency of the event waveform 302, the program 224 in step 408 may continue to receive additional cycles 306 in the measurement waveform 304 sequence from each receiver yet to detect the event waveform 302.

After the event waveform 302 has been detected by a next receiver (e.g., receiver 112, 114, or 116), the program 224 identifies the number of cycles or cycle count in the measurement waveform sequence detected by the next receiver between time ($t_0$) and the time (e.g., $t_1$, $t_2$, or $t_3$) the next receiver detected the event waveform 302 (step 412). As discussed above, the program 224 may store the identified cycle count 244, 246, and 248 detected by the next receiver 112, 114, and 116 in secondary storage 220 or memory 222.

In another implementation, the next receiver 112, 114, and 116 may be provided with the time $t_0$ reflecting the first detection of the event waveform 302 and in response report the respective cycle count 244, 246, and 248 to the program 224.

Next, the program 224 converts the number of cycles or cycle count of the next receiver into a corresponding distance $d_1$, $d_2$, or $d_3$ (step 414). The distance from the reference point (transmitter) to each receiver is equal to the unknown range R plus the measured distance.

In one implementation, the relative positioning program 224 converts the cycle count 244, 246, or 248 of the next receiver into a corresponding distance $d_1$, $d_2$, or $d_3$ by multiplying the cycle count 244, 246, and 248 by the wavelength ($\lambda$) of the measurement waveform 304, which may be derived from the second frequency ($f=1/\lambda$) of the measurement waveform 304.

The program 224 then determines whether there are more receivers that have yet to detect the event waveform or that have a cycle count yet to be converted (step 416). If there are more receivers, the program 224 identifies the next receiver as the next receiver yet to detect the event waveform 302 (step 418) and continues processing at step 410 so that the program 224 is able to obtain a cycle count 236, 238, or 240 for each of the three receivers 112, 114, and 116 other than the first receiver 110 to detect the event waveform 302.

If there are no more receivers, the program 224 then retrieves the location coordinates 226, 228, 230, and 232 for each receiver 110, 112, 114, and 116 (step 420) and calculates the differences $\tilde{x}_i$, $\tilde{y}_i$, and $\tilde{z}_i$ between the respective coordinates of the first receiver 110 and each other receiver 112, 114, and 116 (step 422) as shown in Equation (3) above.

Next, the program 224 calculates the coordinates $R_x$, $R_y$, $R_z$ of the reference vehicle 102 using a triangulation technique based on the distances $d_1$, $d_2$, or $d_3$ and the differences $\tilde{x}_i$, $\tilde{y}_i$, and $\tilde{z}_i$ between the respective coordinates of the first receiver 110 and each other receiver 112, 114, and 116. In one implementation, the program 224 may compute the coordinates ($R_x$, $R_y$, $R_z$) by expanding the squared terms in Equation (2) and combining with Equation (1) to derive a set of triangulation equations (4A–C) represented by $f_1$, $f_2$, and $f_3$:

$$f_1: d_1\sqrt{R_x^2+R_y^2+R_z^2}+R_x\tilde{x}_1+R_y\tilde{y}_1+R_z\tilde{z}_1-\tfrac{1}{2}(p_1)=0 \quad (4A)$$

$$f_2: d_2\sqrt{R_x^2+R_y^2+R_z^2}+R_x\tilde{x}_2+R_y\tilde{y}_2+R_z\tilde{z}_2-\tfrac{1}{2}(p_2)=0 \quad (4B)$$

$$f_3: d_3\sqrt{R_x^2+R_y^2+R_z^2}+R_x\tilde{x}_3+R_y\tilde{y}_3+R_z\tilde{z}_3-\tfrac{1}{2}(p_3)=0 \quad (4C)$$

where $p_i=\tilde{x}_i^2+\tilde{y}_i^2+\tilde{z}_i^2-d_j^2$ for $i=1,2,3$

The program 224 may then solve the three equations to derive the coordinates $R_x$, $R_y$, $R_z$, by the three-dimensional Newton-Raphson gradient triangulation technique shown below in Equation (5) or by another known technique for processing triangulation equations.

$$\begin{bmatrix} R_x \\ R_y \\ R_z \end{bmatrix}_{k+1} = \begin{bmatrix} R_x \\ R_y \\ R_z \end{bmatrix}_k - \begin{bmatrix} \frac{\partial f_1}{\partial R_x} & \frac{\partial f_1}{\partial R_y} & \frac{\partial f_1}{\partial R_z} \\ \frac{\partial f_2}{\partial R_x} & \frac{\partial f_2}{\partial R_y} & \frac{\partial f_2}{\partial R_z} \\ \frac{\partial f_3}{\partial R_x} & \frac{\partial f_3}{\partial R_y} & \frac{\partial f_3}{\partial R_z} \end{bmatrix}_k^{-1} \begin{bmatrix} f_1 \\ f_2 \\ f_3 \end{bmatrix}_k \quad (5)$$

The program 224 may then identify the position of the reference vehicle 102 relative to the autonomous vehicle 104 based on the reference vehicle 102 coordinates ($R_x$, $R_y$, $R_z$)

and the location coordinates 226 ($x_0$, $y_0$, $z_0$) of the first receiver (step 426). In one implementation, the program 224 may compute the precise position of the reference vehicle 102 (or stationary reference point) in the autonomous vehicle 104 body-axis coordinate system 120 as shown in Equation (6).

$$(R_x+x_o), (R_y+y_o), (R_z+z_o) \qquad (6)$$

The position of the reference vehicle 102 determined in the body-axis coordinate system 120 can be used as feedback to a guidance control law (not shown in Figs.) implemented in the computer system 118 or the actuator control computer system 210 to maintain the autonomous vehicle 104 in a desired position relative to the reference vehicle 102 or point. If required, rate information (i.e., relative velocity) may also be computed by the program 224 by numerically differentiating the time correlated position data, for example, as derived using Equation 6. Therefore, methods, systems, and articles of manufacture consistent with one implementation of the present invention determine the position or location of a reference vehicle or stationary point relative to an autonomous (or control) vehicle, allowing the autonomous vehicle to maintain a predetermined distance, range, or guidance profile relative to the reference vehicle or point without the reference vehicle or point communicating position information to the autonomous vehicle.

The foregoing description of an implementation of the invention has been presented for purposes of illustration and description. The description is not exhaustive and does not limit the invention to the precise form disclosed. Modifications and variations are possible in light of the above teachings or may be acquired from practicing the invention. For example, the described implementation includes software (e.g., relative positioning program 224) but the present implementation may be implemented as a combination of hardware and software or hardware alone. Further, the illustrative processing steps performed by the program 224 can be executed in an order different than described above, and additional processing steps can be incorporated. The invention may be implemented with both object-oriented and non-object-oriented programming systems. The scope of the invention is defined by the claims and their equivalents.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions without departing from the scope of the invention, it is intended that all matter contained in the above description or shown in the accompanying drawings shall be interpreted as illustrative and not in a limiting sense.

What is claimed is:

1. A method in a vehicle for determining a position of a reference point relative to the vehicle, the reference point having a transmitter and the vehicle having a plurality of receivers, the transmitter being operatively configured to transmit a first waveform and a second waveform having a relationship with the first waveform, the method comprising:
    detecting the first waveform by each of the receivers;
    detecting the second waveform by at least three of the receivers;
    identifying a first time when the first waveform is detected by a first of the receivers;
    identifying, for each of the receivers detecting the second waveform, a respective number of cycles of the second waveform detected by the respective receiver between the first time and when the first waveform is detected by the respective receiver;
    calculating the position of the reference point using a triangulation technique; and
    maintaining the vehicle relative to the reference point based on the position of the reference point.

2. A method as set forth in claim 1 wherein each receiver is disposed at one of a plurality of locations relative to the vehicle.

3. A method as set forth in claim 2 wherein the triangulation technique is based on the respective number of cycles identified for each of the receivers detecting the second waveform and the location relative to the vehicle of each receiver detecting the second waveform.

4. A method as set forth in claim 3 wherein the first receiver is positioned closest of the receivers to the reference point.

5. A method as set forth in claim 1 wherein the second waveform has a frequency higher than the first waveform.

6. A method as set forth in claim 1 further comprising converting the number of cycles identified for each of the receivers detecting the second waveform into a corresponding distance.

7. A method as set forth in claim 6 wherein the step of converting comprises multiplying the number of cycles for each of the receivers detecting the second waveform by a wavelength ($\lambda$) of the second waveform.

8. A method as set forth in claim 6 wherein each receiver is disposed at one of a plurality of locations relative to the vehicle, and the position of the reference point is calculated using a triangulation technique based on the distance and the location of each receiver detecting the second waveform relative to the vehicle.

9. A method as set forth in claim 6 wherein the step of calculating the position of the reference point further comprises calculating coordinates (Rx, Ry, and Rz) of the reference point relative to the vehicle using three triangulation equations, the three triangulation equations being derived from a range (R) from the reference point to the first receiver and a geometric relationship between the reference point and each of the receivers detecting the second waveform.

10. A computer-readable medium containing instructions that cause a vehicle having a program to perform a method for determining a position of a reference point relative to the vehicle, the reference point having a transmitter and the vehicle having a plurality of receivers, the transmitter being operatively configured to transmit a first waveform and a second waveform having a relationship with the first waveform, the method comprising:
    identifying a first time when the first waveform is detected by a first receiver of the plurality of receivers;
    identifying, for each of the plurality of receivers other than the first receiver, a respective number of cycles of the second waveform detected by the respective receiver between the first time and when the first waveform is detected by the respective receiver;
    calculating the position of the reference point using a triangulation technique; and
    maintaining the vehicle relative to the reference point based on the position of the reference point.

11. A computer-readable medium as set forth in claim 10 wherein each receiver is disposed at one of a plurality of locations relative to the vehicle.

12. A computer-readable medium as set forth in claim 11 wherein the triangulation technique is based on the respective number of cycles identified for each of the receivers detecting the second waveform and the location relative to the vehicle of each receiver detecting the second waveform.

13. A computer-readable medium as set forth in claim 10 wherein the first receiver is positioned closest of the receivers to the reference point.

14. A computer-readable medium as set forth in claim 10 wherein the second waveform has a frequency higher than the first waveform.

15. A computer-readable medium as set forth in claim 10 wherein the method further comprises converting the number of cycles identified for each of the plurality of receivers into a corresponding distance.

16. A computer-readable medium as set forth in claim 15 wherein the step of converting comprises multiplying the number of cycles for each of the receivers by a wavelength ($\lambda$) of the second waveform.

17. A computer-readable medium as set forth in claim 15 wherein each receiver is disposed at one of a plurality of locations relative to the vehicle, and wherein the position of the reference point is calculated using a triangulation technique based on the distance and the location of each receiver relative to the vehicle.

18. A computer-readable medium as set forth in claim 15 wherein the step of calculating the position of the reference point further comprises calculating coordinates (Rx, Ry, and Rz) of the reference point relative to the vehicle using three triangulation equations, the three triangulation equations being derived from a range (R) from the reference point to the first receiver and a geometric relationship between the reference point and each of the receivers detecting the second waveform.

19. A vehicle positioning system comprising:
   a first vehicle having a transmitter operatively configured to emit a first waveform having a first frequency and a second waveform having a second frequency, the second waveform having a plurality of cycles; and
   a second vehicle having a plurality of receivers and a computer system operatively connected to each receiver, each receiver being operatively configured to detect the first waveform and to identify to the computer system a respective number of second waveform cycles detected after the first waveform is detected by a first receiver of the plurality of receivers;
   wherein the computer is operatively configured to convert the respective number of second waveform cycles counted by each of the receivers other than the first receiver into a corresponding distance, and to determine a position of the first vehicle relative to the second vehicle based on the corresponding distances.

20. A vehicle positioning system as set forth in claim 19 wherein each receiver is disposed at one of a plurality of locations within a coordinate system relative to the second vehicle, and the first receiver is positioned closest of the receivers to the reference point.

21. A vehicle positioning system as set forth in claim 19 wherein the second frequency of the second waveform is higher than the first frequency of the first waveform.

22. A vehicle positioning system as set forth in claim 19 wherein each receiver is disposed at one of a plurality of locations relative to the second vehicle, and the position of the first vehicle is calculated using a triangulation technique based on the corresponding distances and the locations of the at least three receivers.

23. A vehicle positioning system as set forth in claim 19 wherein the position of the first vehicle is determined by calculating coordinates (Rx, Ry, and Rz) of the reference point relative to the vehicle using three triangulation equations, the three triangulation equations being derived from a range (R) from the reference point to the first receiver and a geometric relationship between the second vehicle and each of the receivers.

24. A system for determining a position of a reference point relative to a vehicle, the reference point having a transmitter and the vehicle having a plurality of receivers, the transmitter being operatively configured to transmit a first waveform and a second waveform having a relationship with the first waveform, the system comprising:
   means for detecting the first waveform by each of the receivers;
   means for detecting the second waveform by at least three of the receivers;
   means for identifying a first time when the first waveform is detected by a first of the receivers;
   means for identifying, for each of the receivers detecting the second waveform, a respective number of cycles of the second waveform detected by the respective receiver between the first time and when the first waveform is detected by the respective receiver; and
   means for calculating the position of the reference point using a triangulation technique.

25. A system as set forth in claim 24 wherein each receiver is disposed at one of a plurality of locations relative to the vehicle.

26. A system as set forth in claim 25 wherein the triangulation technique is based on the respective number of cycles identified for each of the receivers detecting the second waveform and the location relative to the vehicle of each receiver detecting the second waveform.

* * * * *